(12) United States Patent
Mattes et al.

(10) Patent No.: US 9,344,403 B2
(45) Date of Patent: May 17, 2016

(54) INDUSTRIAL NETWORK SECURITY

(71) Applicant: Tempered Networks, Inc., Seattle, WA (US)

(72) Inventors: David Mattes, Seattle, WA (US); Ludwin Fuchs, Seattle, WA (US); Eric Artzt, Seattle, WA (US)

(73) Assignee: Tempered Networks, Inc., Seattle, WA (US)

( * ) Notice: Subject to any disclaimer, the term of this patent is extended or adjusted under 35 U.S.C. 154(b) by 0 days.

(21) Appl. No.: 14/204,907

(22) Filed: Mar. 11, 2014

(65) Prior Publication Data

US 2014/0282850 A1    Sep. 18, 2014

Related U.S. Application Data (60) Provisional application No. 61/794,511, filed on Mar. 15, 2013.

(51) Int. Cl.
*H04L 29/06* (2006.01)

(52) U.S. Cl.
CPC .................... *H04L 63/0272* (2013.01)

(58) Field of Classification Search
CPC ................. H04L 63/00; H04L 63/02
See application file for complete search history.

(56) References Cited

U.S. PATENT DOCUMENTS

| | | | | |
|---|---|---|---|---|
| 5,835,727 | A * | 11/1998 | Wong | H04L 63/102 370/230 |
| 6,981,156 | B1 | 12/2005 | Stern et al. | |
| 7,881,199 | B2 | 2/2011 | Krstulich | |
| 7,996,894 | B1 * | 8/2011 | Chen et al. | 726/22 |
| 8,959,513 | B1 * | 2/2015 | Swaminathan | 718/1 |

(Continued)

FOREIGN PATENT DOCUMENTS

| | | |
|---|---|---|
| WO | 2007/038872 A1 | 4/2007 |
| WO | 2008/039506 A2 | 7/2014 |

OTHER PUBLICATIONS

Sadanori Aoyagi, Makoto Tazikawa, Masato Saito, Hiroto Aida, Hideyuki Tokuda: "ELA: a fully distributed VPN system over peer-to-peer network"; Proceedings of the 2005 Symposium on Applications and the Internet (SAINT'05), IEEE, Computer Society, 4 pages.*

(Continued)

*Primary Examiner* — Catherine Thiaw
(74) *Attorney, Agent, or Firm* — John W. Branch; Lowe Graham Jones PLLC (57) ABSTRACT

A private overlay network is introduced into an existing core network infrastructure to control information flow between private secure environments. Such a scheme can be used to connect a factory automation network linking operations devices to a corporate network linking various business units, with enhanced network security. Such a connection can be facilitated by introducing into the existing infrastructure a set of industrial security appliances (ISAs) that work together to create an encrypted tunnel between the two networks. The set of ISAs can be scalable to overlay differently sized core networks, to create the private overlay network. Connections to the private overlay network can be managed by the ISAs in a distributed fashion, implementing a peer-to-peer dynamic mesh policy. The industrial security system disclosed may be particularly advantageous in environments such as public utility systems, medical facilities, and energy delivery systems.

12 Claims, 10 Drawing Sheets

(56) References Cited

U.S. PATENT DOCUMENTS

| | | | | |
|---|---|---|---|---|
| 2002/0073182 | A1* | 6/2002 | Zakurdaev | H04L 12/2856 709/220 |
| 2004/0268121 | A1 | 12/2004 | Shelest et al. | |
| 2007/0019641 | A1 | 1/2007 | Pai et al. | |
| 2007/0226781 | A1* | 9/2007 | Chen | H04L 63/0227 726/4 |
| 2008/0082823 | A1* | 4/2008 | Starrett | H04L 9/0825 713/171 |
| 2008/0307519 | A1* | 12/2008 | Curcio et al. | 726/15 |
| 2009/0210518 | A1* | 8/2009 | Verma | H04L 29/12028 709/220 |
| 2010/0024026 | A1 | 1/2010 | Ylonen et al. | |
| 2010/0214959 | A1 | 8/2010 | Kuehnel et al. | |
| 2010/0218235 | A1 | 8/2010 | Ganot | |
| 2010/0254395 | A1 | 10/2010 | Smith et al. | |
| 2044/0016509 | | 1/2011 | Huang et al. | |
| 2011/0090892 | A1 | 4/2011 | Cooke | |
| 2011/0103393 | A1 | 5/2011 | Meier et al. | |
| 2011/0141881 | A1* | 6/2011 | Joshi et al. | 370/219 |
| 2013/0018993 | A1* | 1/2013 | Hui | H04L 41/0803 709/220 |
| 2013/0083725 | A1* | 4/2013 | Mallya | H04L 63/20 370/328 |
| 2013/0283364 | A1* | 10/2013 | Chang | H04L 49/70 726/12 |
| 2014/0133354 | A1* | 5/2014 | Scharf | H04L 45/42 370/254 |
| 2014/0150070 | A1 | 5/2014 | Peterson | |
| 2014/0223507 | A1* | 8/2014 | Xu | 726/1 |
| 2014/0307744 | A1 | 10/2014 | Dunbar et al. | |
| 2015/0046997 | A1 | 2/2015 | Gupta et al. | |

OTHER PUBLICATIONS

Djohara Benyamina, Abdelhakim Hafid, Michel Gendreau: "Wireless mesh networks design—a survey", IEEE Communications Survey & Tutorialsm vol. 14, No. 2, second quarter 2012, pp. 299-310.*
Asguard Networks, Inc., "SimpleConnect™ Product Information," Retrieved on Nov. 9, 2012, from http://www.asguardnetworks.com/product, 1 page.
Asguard Networks, Inc., "Welcome to Asguard Networks," Retrieved on Oct. 23, 2012, from http://www.asguardnetworks.com/, 1 page.
Asguard Networks, "SimpleConnect™ Quick Start Documentation Guide," Revision 1, Dec. 13, 2012, 18 pages.
Henderson et al., "HIP-based Virtual Private LAN Service (HIPLS)," Network Working Group, Internet-Draft, The Boeing Company, Nov. 6, 2012, 16 pages.
International Search Report for corresponding U.S. Application No. PCT/US2014/023632, mailed Jun. 23, 2014, 3 pages.
Asguard Network, Inc., "Gray Matter Systems Announces Asguard Networks Partnership at 2012 Gray Matter Systems Training and User Group Meeting," Aug. 9, 2012, retrieved on Oct. 23, 2012, from http://www.asguardnetworks.com/news, 2 pages.
Trusted Computing Group, Incorporated, "TCG Trusted Network Connect: IF-MAP Metadata for ICS Security," Specification Version 1.0, Revision 44, May 8, 2014, 64 pages.
Office Communication for U.S. Appl. No. 14/740,053 mailed on Jul. 29, 2015 (10 pages).
International Search Report and Written Opinion for International Patent Application No. PCT/US2015/042993 mailed on Nov. 11, 2015, 11 pages.
Office Communication for U.S. Appl. No. 14/740,053 mailed on Jan. 21, 2016 (18 pages).
Office Communication for U.S. Patent Application No. 14/814, 283 mailed on Nov. 30, 2015 (8 pp.).

* cited by examiner

INDUSTRIAL NETWORK SECURITY

BACKGROUND

1. Technical Field

The present disclosure generally relates to data and communications security for networks that enable connectivity among industrial assets, and between an industrial automation network and a general purpose network.

2. Description of the Related Art

Industrial equipment, such as manufacturing equipment used to build or assemble products, is typically supported by an industrial automation system and an associated industrial communications network. In an industrial automation system, operation of each machine that handles a product can be controlled by a dedicated operations device such as a workstation computer. In addition to supervising and controlling operation of a particular machine, the workstation computer can collect data from the machine for purposes of monitoring a manufacturing or assembly process, monitoring and improving operational efficiency and throughput, quality control, and the like.

A workstation computer tied to an industrial machine can be separate from the machine or built into the machine. Furthermore, the machine can be stationary or mobile. Mobile manufacturing machines may be used, for example, in the automotive, shipbuilding, and aerospace industries, to assemble vehicle products which can be much larger than the equipment used to build them. In such cases, it can be more efficient to move processing equipment to a stationary product rather than attempting to move the product from one stationary piece of equipment to another.

If a manufacturing machine is mobile and its associated workstation computer is separate from the machine, it may be desirable for the workstation computer to support wireless communication with the machine. Furthermore, it can be beneficial for certain personnel, such as authorized operators, service technicians, engineers, production managers, and the like, to gain remote access to the manufacturing computing environment, and possibly to specific workstation computers. In addition, there may be advantages to providing wireless connectivity so that workstation controllers can access the Internet. However, such increased connectivity exposes factory automation systems to a higher level of operational risk, and generally makes the manufacturing environment more vulnerable to breaches of information security. Therefore, it is important that proper network security is in place to effectively limit the remote access, and/or certain levels of access, to designated users.

Workstation computers are typically coupled to a database server and an operations database via an industrial automation communications network so that data collected from various operational machines can be made available for statistical analysis, debugging, failure analysis, and the like. The operations database may be integrated with a corporate-wide business system (e.g., enterprise business network) that aggregates data from various arms of a business organization, for example, development, operations, marketing, and accounting. Alternatively, the industrial automation communications network may be integrated directly with a business network.

In general, the coupling of computer networks is dynamic, such that computers may enter or exit a network frequently, on a random basis. Such dynamic network connections are typically administered using a network protocol such as the dynamic host configuration protocol (DHCP) which is set up to configure networked devices and assign internet protocol (IP addresses) each time the device requests connection to the network. Typically, DHCP is implemented on a DHCP server which maintains a database of available IP addresses and configuration information in accordance with agreed-upon industry standards.

Often, the protocols used for industrial automation communications networks differ from, or are incompatible with, standard DHCP protocols used for business networks, making connectivity relationships between the two types of networks challenging. In addition, many industrial automation systems were not designed with information security in mind, but now require secure connectivity to be compatible with business network security protocols, or to be compliant with regulatory standards. Even when security measures are put in place, a network having a DHCP server is inherently vulnerable to attack. For example, a rogue DHCP server could intrude and take control of managing network connectivity.

BRIEF SUMMARY

One way to secure network communications is to provide a network segmentation scheme in which a communications hierarchy is introduced to isolate vulnerable nodes. Within such a secure network, communication may be facilitated at or between different levels, by introducing a private overlay network into an existing core network infrastructure to control information flow between private secure environments. Such a scheme can be used for example, to connect a factory automation network linking machine workstation controllers to a corporate network linking various business units, with enhanced network security. Such a connection can be facilitated by introducing into the existing infrastructure a set of industrial security appliances (ISAs) that work together to create an encrypted tunnel between the two networks. The set of ISAs can be scalable to create differently sized private overlay networks. A private network is a network that is limited to connectivity with other local devices and lacks connectivity to devices outside of the local network, such that IP data packets addressed within the private network cannot be transmitted onto the general purpose network infrastructure. Thus, while a standard DHCP protocol implemented on a DHCP server may administer connections to a public network or a corporate network, connections to the private overlay network can be managed locally, according to separate standards designed for private networks. Such local management of the private overlay network described herein can be handled in a distributed fashion by the ISAs in conjunction with a proprietary management platform (SCMP). Distributing the communications protocol inherently provides additional security by de-centralizing functionality and information.

An ISA can also be introduced temporarily between an authorized user and the factory automation network. ISAs are desirably hard-wired to the factory automation network, but they can be wirelessly connected to the remote users and to the corporate network. Although the ISA is an intermediate component, it may not be detectable to the user. From the user's point of view, it appears that a direct connection has been made to the automation network. Insertion of the ISAs can be administered in a dynamic fashion so that security devices need not be dedicated, but instead, they can be re-configured for use throughout the network infrastructure on an as-needed basis so that access is granted only when it is required.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, server computers, and/or communications networks have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
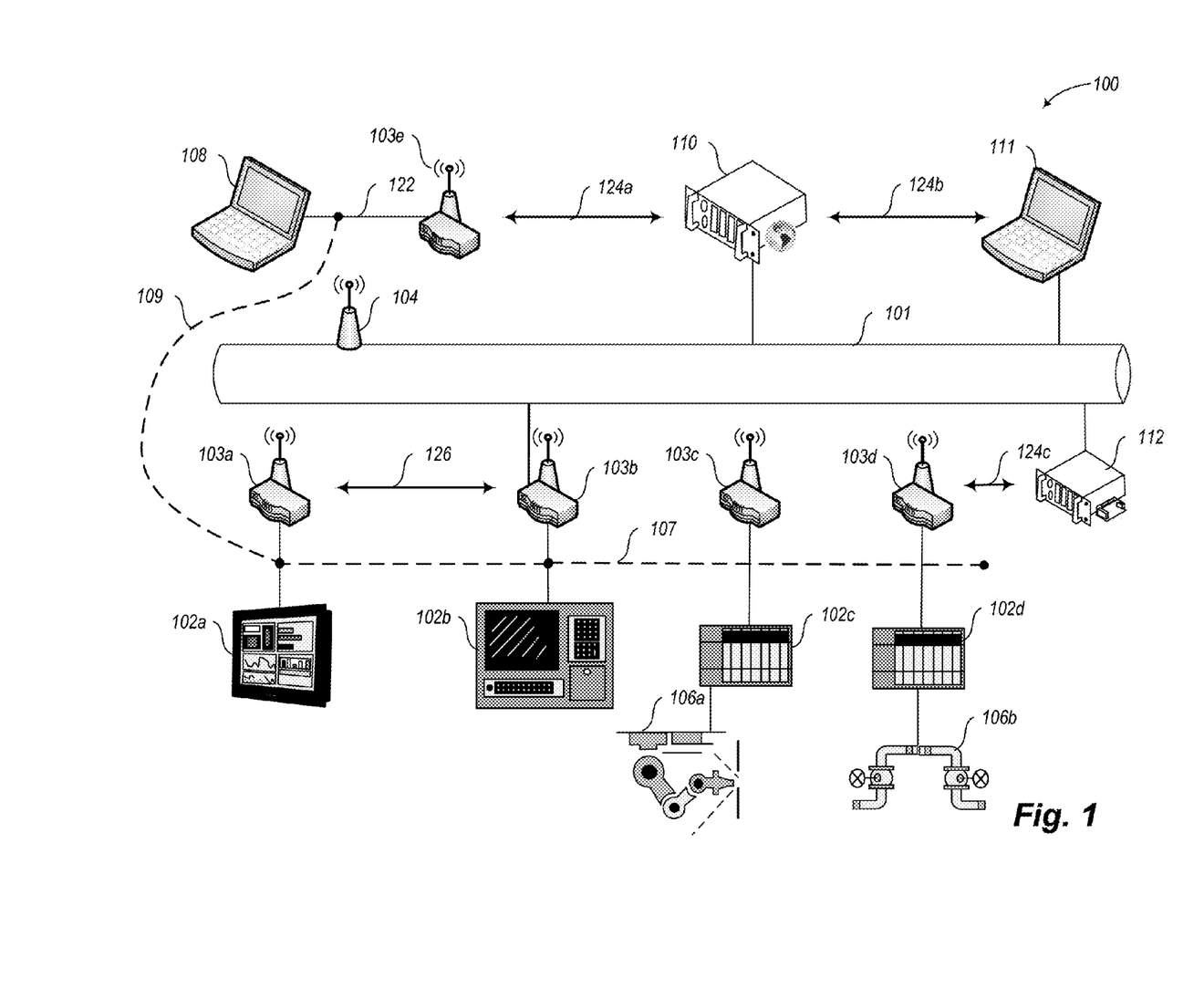
FIG. 1 is a schematic view of a generalized networked computing environment according to one illustrated embodiment, in which an industrial network security system is introduced into an existing infrastructure.

FIG. 1 shows a networked environment 100 in which an exemplary business network 101 is coupled to a plurality of operations devices 102a-102d (four shown, collectively 102) via a plurality of ISAs 103a-103e (five shown, collectively 103). ISAs 103 may be coupled directly to the business network 101, or wirelessly via a wireless connection port 104. Each of the operations devices 102 may be coupled directly or wirelessly to one or more industrial devices 106a-106b (two shown, collectively 106), such as, for example, an automated manufacturing machine or tooling (e.g., numerically controlled machinery) that processes a product. The ISAs 103 communicate with one another via a private overlay network 107. A remote user (e.g., a remote engineer) 108 may connect to the private overlay network 107 via a remote access wireless communication path 109. A management platform (SCMP) 110 and an associated user station 111 are coupled to the business network 101.

The management platform 110, the ISAs 103, and the user station 111 can be, for example, SimpleConnect™ devices, commercially available from Asguard Networks, Inc. The ISAs 103 can be introduced into the networked environment 100 as protective devices, each ISA 103 associated with, and coupled to, a particular operations device 102. The ISAs 103 can be provider edge (PE) devices that provide dynamic, secure connectivity among the operations devices 102, and between the operations devices 102 and the business network 101. The ISAs can be physical devices or they can be implemented as virtual devices. A virtual ISA constitutes software that performs the same or similar function as a corresponding processor-based device. The software implementing a virtual ISA can be hosted on a system or a device that is not otherwise dedicated to providing secured networked communications, e.g., a local device, a remote device, or a server in the cloud.

The private overlay network 107 is a virtual network—a logical construct (shown as a dotted line in FIG. 1)—that can be overlaid onto an existing physical infrastructure that includes the existing business network 101 and the existing operations devices 102, generally referred to as "legacy devices." The private overlay network 107 can be a virtual private LAN service (VPLS) that connects physically separate LAN segments (e.g., the business network and the industrial network) into a single logical LAN segment. However, the private overlay network provides an isolated environment that is segmented from the business network. The private overlay network 107 can be configured as a dynamic mesh network. The term "full mesh" refers to a mesh network topology in which every node is coupled to every other node. A dynamic mesh network is a policy-constrained mesh in which each communicates with only certain other designated nodes. Many existing mesh networks are not dynamic. Segments of the virtual private overlay network 107 network can be enabled or disabled by the management platform 110, in response to mesh policy decisions received from a user via the user station 111.

A DHCP server 112 can be coupled to the business network 101 to administer connecting various corporate devices to the business network 101. Communications traffic 124a-124b on the business network side of the communications environment 100 can be https Web traffic which is encrypted. However, communications traffic 124c to and from the DHCP server 112 may be non-encrypted. Communications traffic 126 between ISAs 103 coupled to the private overlay network is encrypted. For enhanced security, management of connections to the private overlay network can be administered in a secure, distributed fashion by the ISAs 103 according to the distributed DHCP scheme described herein.

The operations devices 102 may take any of a variety of forms. For example, the operations devices 102 may be industrial equipment controllers that control processing equipment 106a in a manufacturing operation. Additionally or alternatively, the operations devices 102 can be distributed utility devices for controlling utilities 106b (e.g., factory utilities, municipal water systems, power systems, energy delivery systems, and the like). Alternatively, the operations devices 102 can be controllers or workstations for operating medical equipment (e.g., medical imaging equipment) in a medical facility. Alternatively, the operations devices 102 can themselves be networks of operational equipment, for example, networks located at different manufacturing sites that are part of the same business or corporation. Alternatively, the operations devices 102 can be workstations or servers in an office-based operation.

Each operations device 102 may be logically or otherwise associated with one or more industrial devices 106. The operations devices 102 can be processor-based customer edge (CE) devices that may take any of a large variety of forms, including but not limited to personal computers (e.g., desktop computers, laptop computers, notebook computers, tablet computers, smart phones, workstation computers, and/or mainframe computers, and the like.) At least the operations devices 102, the ISAs 103, and the management platform 110 are capable of communication, for example via one or more networks 107, 101 (e.g., Wide Area Networks, Local Area Networks, or packet switched communications networks such as the Internet, Worldwide Web portion of the Internet, extranets, intranets, and/or various other types of telecommunications networks such as cellular phone and data networks, and plain old telephone system (POTS) networks. One or more communications interface devices may provide communications between the operations devices 102 and the network(s) 107, 101. The communications interface devices may take any of a wide variety of forms, including modems (e.g., DSL modem, cable modem), routers, network switches, and/or bridges, etc. The communications interface devices can be built into the operations devices or, if separate from the operations devices 102, can communicate with the operations devices 102 using a wired communication channel, a wireless communication channel, or combinations thereof. The operations devices 102 may be coupled to an industrial network.

The operations devices 102, the ISAs 103, and the management platform 110 include at least one non-transitory processor-readable storage medium (e.g., hard drive, RFID, RAM). The storage medium stores instructions for causing the associated device to perform various functions as described below. In many implementations the non-transitory processor-readable storage medium may constitute a plurality of non-transitory storage media. The plurality of non-transitory storage media may be commonly located at a common location, or distributed at a variety of remote locations. Databases may be implemented in one, or across more than one, non-transitory computer- or processor-readable storage media. Such database(s) may be stored separately from one another on separate non-transitory processor-readable storage medium or may be stored on the same non-transitory processor-readable storage medium as one another. The non-transitory processor-readable storage medium may be co-located with the management platform 110, for example, in the same room, building or facility. Alternatively, the non-transitory processor-readable storage medium may be located remotely from the management platform 110, for example in a different facility, city, state or country. Electronic or digital information, files or records or other collections of information may be stored at specific locations in non-transitory processor-readable media, thus are logically addressable portions of such media, which may or may not be contiguous.

The networked environment 100 shown in FIG. 1 is representative. Typical networked environments may include additional, or fewer, computer systems and entities than illustrated in FIG. 1. The concepts taught herein may be employed in a similar fashion with more (or less) populated networked environments than that illustrated.

Figure 2:
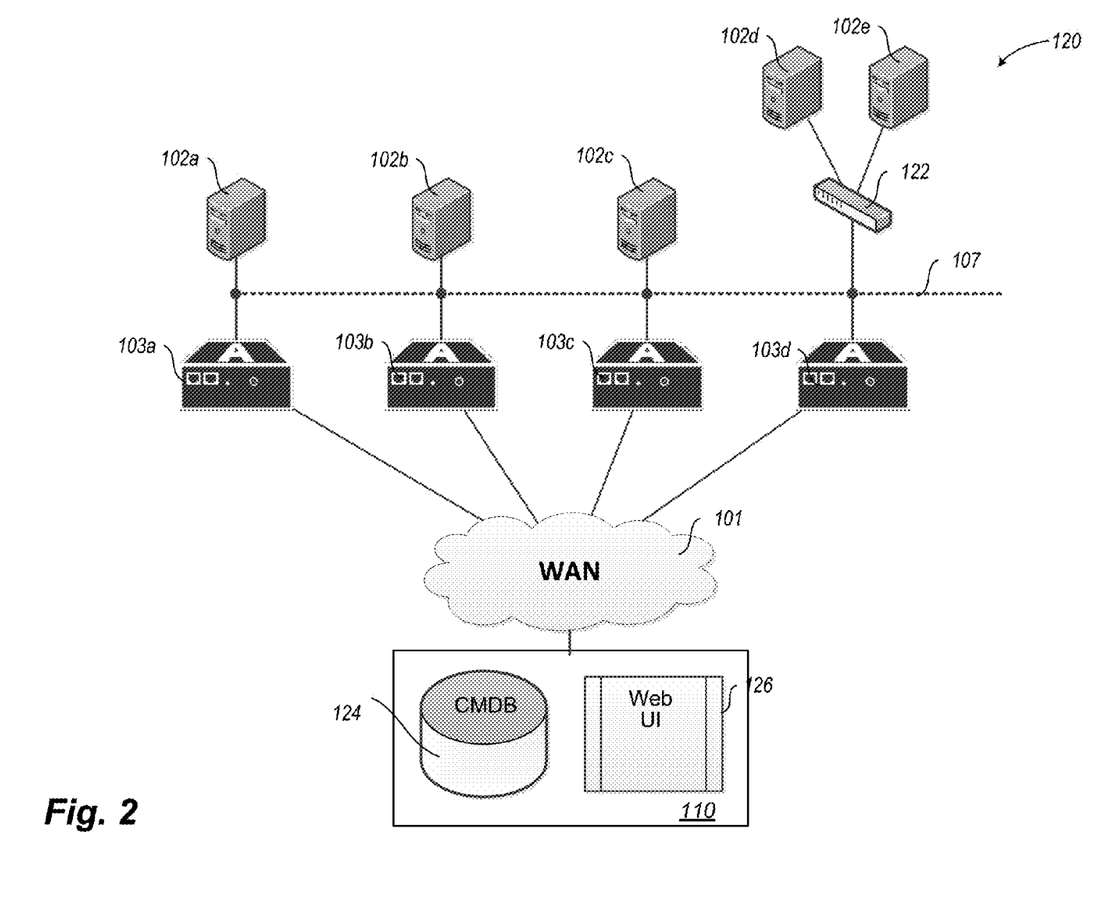
FIG. 2 is a schematic view of an industrial network security system, according to one illustrated embodiment.

FIG. 2 shows an industrial network security system 120 according to one embodiment. The industrial network security system 120 can be regarded as a subset of the overall networked environment 100. Although not required, the embodiments will be described in the general context of computer-executable instructions, such as program application modules, objects, or macros stored on computer- or processor-readable media and executed by a computer or processor. Those skilled in the relevant art will appreciate that the illustrated embodiments, as well as other embodiments, can be practiced with other system configurations and/or other computing system configurations, including hand-held devices (e.g., smart phones, tablet devices, netbooks, personal digital assistants), multiprocessor systems, microprocessor-based or programmable consumer electronics, personal computers ("PCs"), networked PCs, mini computers, mainframe computers, and the like. The embodiments can be practiced in distributed computing environments where tasks or modules are performed by remote processing devices, which are linked through a communications network. In a distributed computing environment, program modules may be located in both local and remote medium storage devices or media.

FIG. 2 shows a networked environment 120 comprising a plurality of ISAs 103 (four illustrated) having at least one associated non-transitory processor-readable storage medium. The ISA is communicatively coupled between the private overlay network 107 and the business network (e.g., WAN) 101 via one or more communications channels, for example, one or more parallel cables, serial cables, or wireless channels capable of high speed communications, for instance, via one or more of FireWire®, Universal Serial Bus® (USB), Thunderbolt®, or Gigabyte Ethernet®.

The networked environment 120 also comprises one or more generic legacy nodes (LNs) which may be the operations devices 102 (five illustrated). The operations devices 102 are communicatively coupled to the ISAs 103 via the private overlay network 107 by one or more wired or wireless communications channels. Network access to the operations devices 102 may also be controlled via a hardware or software switch 122. The operations devices 102 may take the form of server devices, desktop computers, workstations, customized equipment controllers, or mobile electronic devices such as smart phones, notebook computers, or tablet computers. The management platform 110 includes a configuration management database 124 stored on suitable non-transitory computer-or processor-readable media. Each ISA has an asynchronous subscription to the configuration management database 124 that governs network addressing of the operations devices 102 for access to the private overlay network. The management platform 110 also provides a Web user interface 126 through which the distributed dynamic host configuration protocol can be administered to manage network access of the operations devices 102.

The private overlay network 107, along with the ISAs 103 and the management platform 110 constitute a "drop-in" system that can be overlaid on an existing infrastructure, and which is backward-compatible with existing operations devices 102. Henceforth, the terms operations devices 102 and "legacy devices" 102 will be used interchangeably. It is assumed that the legacy devices are accustomed to use of a standard dynamic host configuration protocol for connecting to a network. The drop-in system is designed to be transparent to such legacy devices 102, thereby allowing high availability of the operations devices 102 to be maintained. This is an important consideration when, for example, a production line, telecommunications infrastructure, power plant, power supply system (e.g., grid), or medical facility might otherwise be forced to suffer significant down time to install a new network security system.

The networked environments 100 and 200 may employ other computer systems and network equipment, for example, additional servers, proxy servers, firewalls, routers and/or bridges. Unless described otherwise, the construction and operation of the various blocks shown in FIGS. 1-2 are of conventional design. As a result, such blocks need not be described in further detail herein, as they will be understood by those skilled in the relevant art.

The ISAs 103 may include one or more processing units 212a, 212b (collectively 212), a system memory 214 and a system bus 216 that couples various system components, including the system memory 214 to the processing units 212. The processing units 212 may be any logic processing unit, such as one or more central processing units (CPUs) 212a, cryptographic accelerators 212b, application-specific integrated circuits (ASICs), field programmable gate arrays (FPGAs), etc. The system bus 216 can employ any known bus structures or architectures, including a medium bus with a medium controller, a peripheral bus, and/or a local bus. The system memory 214 includes read-only medium ("ROM") 218 and random access medium ("RAM") 220. A basic input/output system ("BIOS") 222, which can form part of the ROM 218, contains basic routines that help transfer information between elements within the ISAs 103, such as during start-up.

The ISAs 103 may include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a CD-ROM, while the magnetic disk 234 can be a magnetic floppy disk or diskette. The hard disk drive 224, optical disk drive 228 and magnetic disk drive 230 may communicate with the processing unit 212 via the system bus 216. The hard disk drive 224, optical disk drive 228 and magnetic disk drive 230 may include interfaces or controllers (not shown) coupled between such drives and the system bus 216, as is known by those skilled in the relevant art. The disk drives 224, 228 and 230, and their associated processor-readable media 226, 232, 234, provide nonvolatile storage of computer-readable instructions, data structures, program modules and other data for the ISAs 103. Although the depicted ISAs 103 is illustrated employing a hard disk drive 224, optical disk drive 228 and magnetic disk drive 230, those skilled in the relevant art will appreciate that other types of processor-readable media that can store data accessible by a processor-based device may be employed, such as solid state disks (SSD), hybrid (solid state/hard disk) drives, WORM drives, RAID drives, magnetic cassettes, flash medium cards, audio compact disks (CD), digital video disks (DVD), Blu-ray discs (BD), Bernoulli cartridges, RAMs, ROMs, smart cards, etc.

Program modules can be stored in the system memory 214. Such program modules can include an operating system 236, one or more application programs 238, other program modules 240 and program data 242. Application programs 238 may include instructions that cause the processor(s) 212 to receive and automatically store aspect, attribute, or characteristic information about the operations devices 102 (FIG. 1) to the associated non-transitory processor-readable storage medium 124. Application programs 238 may also include instructions that cause the processor(s) 212 to generate, store, or retrieve data structures. The application programs 238 may additionally include instructions that cause the processor(s) 212 to send or receive data to or from management platforms 110, including mobile devices. Such is described in detail herein with reference to the various flow diagrams.

Application programs 238 may include instructions that cause the processor(s) 212 to automatically control access to certain information. For example, the instructions may prevent field service engineers from one equipment supplier from accessing information about operations devices 102 or industrial equipment 106 provided by other equipment suppliers who may be competitors. Or, the instructions may maintain confidentiality of patient data gathered by industrial devices 106 that may include, for example, medical imaging equipment, or medical testing equipment, and the like. Additionally or alternatively, the instructions may limit access to electrical power switching gear to provide security for electrical power grids and/or power generation facilities (e.g., fossil fuel burning plants, nuclear plants, hydroelectric facilities, wind power facilities, and the like.) Application programs 238 may include instructions that cause the processor(s) 212 to automatically send, transmit, transfer, or otherwise provide electronic communications (e.g., messages, replies or responses) between different operations devices 102. For example, an x-ray technician working at one operations device 102a (e.g., a medical imaging workstation) which is coupled to an industrial device 106a (e.g., an x-ray machine) can communicate messages, test results, or images to a general practitioner working at another operational device 102b located in an office environment. Such may include sending, transmitting, transferring or otherwise providing access to electronic or digital messages, with or without images. Such may facilitate seamless contact and establishment of a medical diagnosis or other service customer status. Application programs 238 may include instructions that cause the processor(s) 212 to automatically establish, maintain, update or record operational information pertaining to manufacturing of products.

Application programs 238 may include instructions that cause the processor(s) 212 to automatically establish, maintain, update or record ownership information with respect to operations devices 102, and their associated electronic files or stored data, as well as privileges, permissions or authorizations to perform various acts on such operations devices 102 and associated files such acts including viewing, modifying, annotating, extracting, importing, retrieving, and/or deleting. Application programs 238 may even further include instructions to create entries in and/or query one or more databases which store information or data about manufacturers, service providers, or customers, regardless of the location at which those electronic or digital documents or data are stored. Application programs 238 may further include programs that limit network access based on the geophysical location of the ISA.

Other program modules 240 may include instructions for handling security such as password or other access protection and communications encryption.

The system memory 214 may also include communications programs, for example, a network server 244 that causes the ISA 103 to serve electronic information or files via the Internet, intranets, extranets, telecommunications networks, or other networks as described below. The network server 244 in the depicted embodiment can be markup language based, such as Hypertext Markup Language (HTML), Extensible Markup Language (XML) or Wireless Markup Language (WML), and operates with markup languages that use syntactically delimited characters added to the data of a document to represent the structure of the document. A number of suitable severs may be commercially available such as those from Mozilla, Google, Microsoft and Apple Computer.

Figure 3:
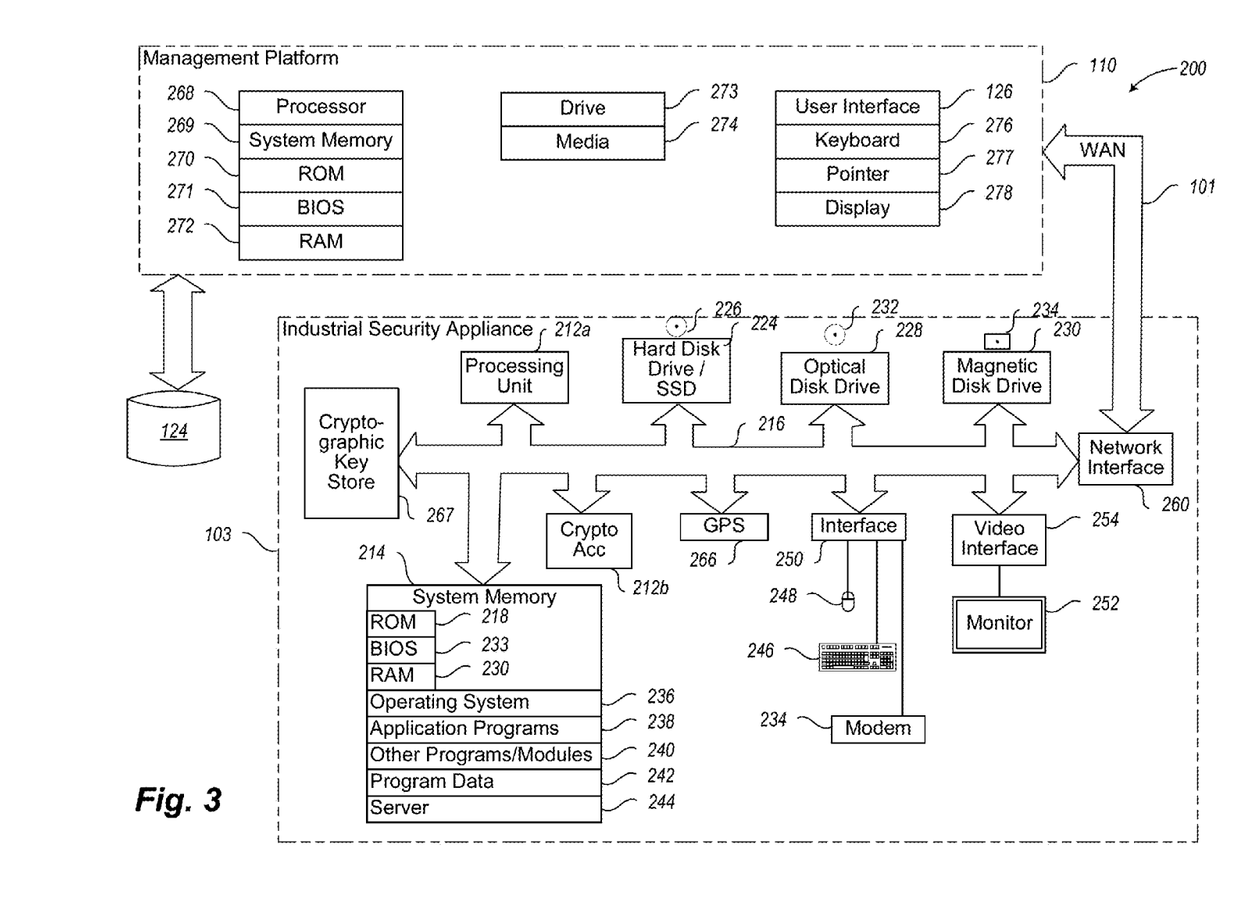
FIG. 3 is a functional block diagram of a management platform networked to one of the industrial security appliances, according to one illustrated embodiment.

While shown in FIG. 3 as being stored in the system memory 214, the operating system 236, application programs 238, other program modules 240, program data 242, and network server 244 can be stored on the hard disk 226 of the hard disk drive 224, the optical disk 232 of the optical disk drive 228 and/or the magnetic disk 234 of the magnetic disk drive 230.

An operator can enter commands and information into the ISA 103 through input devices such as a touch screen or keyboard 246 and/or a pointing device such as a mouse 248, in conjunction with the Web user interface 126. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface, or a universal serial bus ("USB") can be used. A monitor 252 or other display device is coupled to the system bus 216 via a video interface 254, such as a video adapter. The ISAs 103 can include other output devices, such as speakers, printers, etc. One or more GPS devices 266 can be coupled to the system bus 216 to supply location data. A cryptographic key store 267 can be coupled to the system bus 216 to provide storage for a cryptographic key which can be a hardware or software container.

The ISAs 103 can operate in the networked environment 100 using logical connections to one or more remote computers and/or devices. For example, the ISAs 103 can operate in a networked environment 100 using logical connections to one or more management platforms 110. Communications may be via a wired and/or wireless network architecture, for instance, wired and wireless enterprise-wide computer networks, intranets, extranets, and/or the Internet. Other embodiments may include other types of communications networks including telecommunications networks, cellular networks, paging networks, and other mobile networks. There may be any variety of computers, switching devices, routers, bridges, firewalls and other devices in the communications paths between the ISAs 103 and the management platforms 110.

The management platforms 110 will typically take the form of end user processor-based devices, for instance, personal computers (e.g., desktop or laptop computers), netbook computers, tablet computers, smart phones, personal digital assistants (PDAs), workstation computers and/or mainframe computers, and the like, executing appropriate instructions. These management platforms 110 may be communicatively coupled to one or more server computers. For instance, management platforms 110 may be communicatively coupled externally via one or more server computers (not shown), which may implement a firewall. The management platforms 110 may execute a set of server instructions to function as a server for a number of management platform 110 (i.e., clients) communicatively coupled via a LAN at a facility or site, and thus act as intermediaries between the management platforms 110 and the ISAs 103. The management platforms 110 may execute a set of client instructions to function as a client of the server computer(s), which are communicatively coupled via a WAN.

The management platforms 110 may include one or more processing units 268, system storage media 269 and a system bus (not shown) that couples various system components including the system storage media 269 to the processing unit 268. The management platforms 110 will at times each be referred to in the singular herein, but this is not intended to limit the embodiments to a single management platform 110. In typical embodiments, there may be more than one management platform 110.

The processing unit 268 may be any logic processing unit, such as one or more central processing units (CPUs), digital signal processors (DSPs), application-specific integrated circuits (ASICs), field programmable gate arrays (FPGAs), etc. Non-limiting examples of commercially available logic processing units include, for example, a Pentium®, Xeon®, Core®, or Atom® series microprocessor from Intel Corporation, or an A4, A5, or A6 mobile series microprocessor from Apple, Inc. Unless described otherwise, the construction and operation of the various blocks of the management platform 110 shown in FIG. 2 are of conventional design. As a result, such blocks need not be described in further detail herein, as they will be understood by those skilled in the relevant art.

The system bus can employ any known bus structures or architectures, including a medium bus with medium controller, a peripheral bus, and a local bus. The system storage media 269 includes read-only medium ("ROM") 270 and random access medium ("RAM") 272. A basic input/output system ("BIOS") 271, which can form part of the ROM 270, contains basic routines that help transfer information between elements within the management platform 110, such as during start-up.

The management platform 110 may also include one or more media drives 273, e.g., a hard disk drive, magnetic disk drive, WORM drive, and/or optical disk drive, for reading from and writing to non-transitory processor-readable storage media 274, e.g., hard disk, optical disks, and/or magnetic disks. The non-transitory processor-readable storage media 274 may, for example, take the form of removable media. For example, hard disks may take the form of a Winchester drive, and optical disks can take the form of CD-ROMs, while magnetic disks can take the form of magnetic floppy disks or diskettes. The media drive(s) 273 communicate with the processing unit 268 via one or more system buses. The media drives 273 may include interfaces or controllers (not shown) coupled between such drives and the system bus, as is known by those skilled in the relevant art. The media drives 273, and their associated non-transitory processor-readable storage media 274, provide nonvolatile storage of computer readable instructions, data structures, program modules and other data for the management platform 110. Although described as employing non-transitory processor-readable storage media 274 such as hard disks, optical disks and magnetic disks, those skilled in the relevant art will appreciate that management platform 110 may employ other types of non-transitory computer-readable storage media that can store data accessible by a computer, such as magnetic cassettes, flash medium cards, digital video disks ("DVD"), Bernoulli cartridges, RAMs, ROMs, smart cards, etc. Data or information, for example, electronic or digital files or data or metadata related to such can be stored in the non-transitory processor-readable storage media 274.

Program modules, such as an operating system, one or more application programs, other programs or modules and program data, can be stored in the system storage media 269. Program modules may include instructions for accessing a Web site, extranet site or other site or services (e.g., Web services) and associated WebPages, other pages, screens or services hosted by the ISAs 103 or the management platform 110.

In particular, the system storage media 269 may include communications programs that permit the management platform 110 to exchange electronic or digital information or files or data or metadata with the ISA 103. The communications programs may, for example, be a Web client or browser that permits the management platform 110 to access and exchange information, files, data and/or metadata with sources such as Web sites of the Internet, corporate intranets, extranets, or other networks. Such may require that the management platform 110 have sufficient right, permission, privilege or authority for accessing a given Web site, for example, one hosted by the vendor sever computer system(s) 114. The browser may, for example, be markup language based, such as Hypertext Markup Language (HTML), Extensible Markup Language (XML) or Wireless Markup Language (WML), and may operate with markup languages that use syntactically delimited characters added to the data of a document to represent the structure of the document.

While described as being stored in the system storage media 269, the operating system, application programs, other programs/modules, program data and/or browser can be stored on the computer-readable storage media 274 of the media drive(s) 273. An operator can enter commands and information into the management platform 110 via a user interface 275 through input devices such as a touch screen or keyboard 276 and/or a pointing device 277 such as a mouse or a stylus. Voice input can be received from a user by a microphone such as a condenser microphone, headset microphone, or a Bluetooth®-type ear-mounted microphone that can be wirelessly coupled to the management platform 110. Other input devices can include a joystick, game pad, tablet, scanner, etc. These and other input devices are connected to the processing unit 268 through an interface such as a serial port interface that couples to the system bus, although other interfaces such as a parallel port, a game port or a wireless interface or a universal serial bus ("USB") can be used. Output devices such as a display or monitor 278 may be coupled to the system bus via a video interface, such as a video adapter. The management platform 110 can include other output devices, such as printers, audio speakers, headset output ports, USB ports that allow output to memory sticks or USB-compatible electronic devices, etc.

Figure 4:
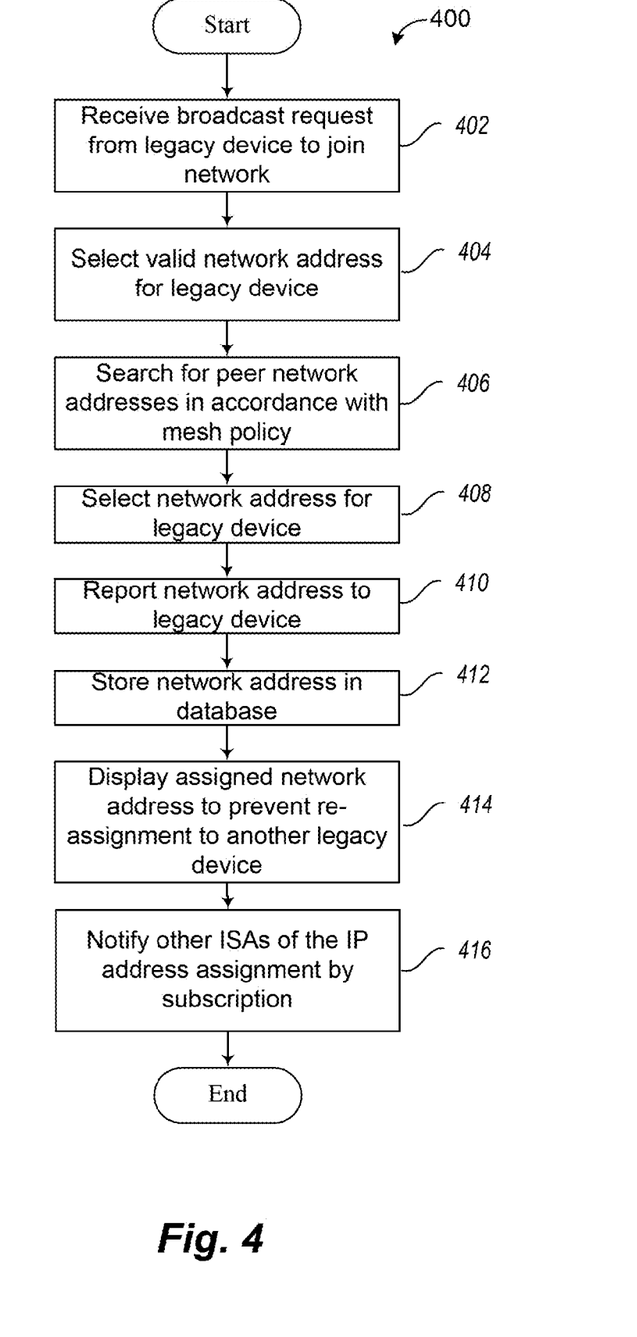
FIG. 4 is a high-level flow diagram showing a method of operation of the industrial network security system functioning as a distributed DHCP, according to one illustrated embodiment.

FIG. 4 illustrates a high level method of operation 400 that can be carried out by the industrial network security system 120 to provide flexible and secure connectivity of a plurality of operations devices 102 (hereinafter called "legacy devices") to the business network 101 using a distributed approach. Such an approach does not need a DHCP. Instead, functions of the DHCP (e.g., assigning IP addresses in a dynamic fashion in response to the legacy devices 102 submitting requests to enter and exit the private overlay network 107) are distributed among a plurality of ISPs 103. However, from the point of view of the legacy devices 102, the method 300 appears to be using a DHCP. If legacy device 102 sends out a DHCP request, a DHCP reply is received, even though the actual protocol used is not DHCP. The method 300 implements a user-selectable peer-to-peer mesh policy selection in which the ISAs can collectively assign dynamic IP addresses. Such a distributed approach requires coordination between the ISAs, (e.g., to ensure the ISAs are not assigning the same IP address to two different legacy devices).

At 402, ISAs 103 can receive a broadcast DHCP request from a legacy device 102 to join the private overlay network 107.

At 404, a valid static IP address is selected for assignment to the legacy device 102.

At 406 a search of the configuration management database 124 is initiated for static legacy node IP addresses for peer ISA's, and in turn, for their peer's ISAs, in accordance with a mesh policy. A subscription to the configuration management database 124 is maintained to receive notifications of changes to the search.

At 408, a legacy node IP address is assigned.

At 410, the assigned IP address is reported to the legacy device 102 in the form of a DHCP reply message.

At 412, the assigned IP address is stored in the configuration management database 124, where the IP address information can be accessed by all of the ISAs 103.

At 414, the assigned IP address is displayed via the Web user interface 126 to prevent re-assignment to another legacy device. Such a re-assignment could potentially occur if a Web user is concurrently providing static IP assignments to some legacy devices At 416, other ISAs receive subscription results for the new legacy device IP address.

After the DHCP lease expires, the legacy device 102 can renew the lease, or the ISA can purge the configuration from the database 124. Alternatively, an ISA can terminate a DHCP lease prior to its expiration, for example, if a user wants to use the DHCP-assigned address as a statically-assigned IP address.

With reference to FIGS. 5-10, a method 500 that implements a user-selectable peer-to-peer mesh policy proceeds as described below. Whereas the method 300 describes management of network connections for the legacy devices 102, the method 500 describes management of network connections for the ISAs (peers) 103. According to the method 500, network connections for each ISA are enabled or disabled by updating a dynamic peer-to-peer mesh policy in response to instructions received through the user interface 126 that runs on the user station 111. The peer-to-peer mesh policy describes the topology of the mesh network at any given time. It is noted that the screen shots shown in FIGS. 6-10 can appear on the display 278 via the user interface 126. The display 278 can be any type of display device, including, a smart phone, tablet, or other mobile display.

At 502, a mesh network can be created to include a list 600 of member devices ("peers"). In accordance with the present embodiment, the peers are security appliances (ISAs). The mesh network described in the examples shown in FIGS. 6-10 is set up to accommodate nine such peer ISAs.

Figure 6:
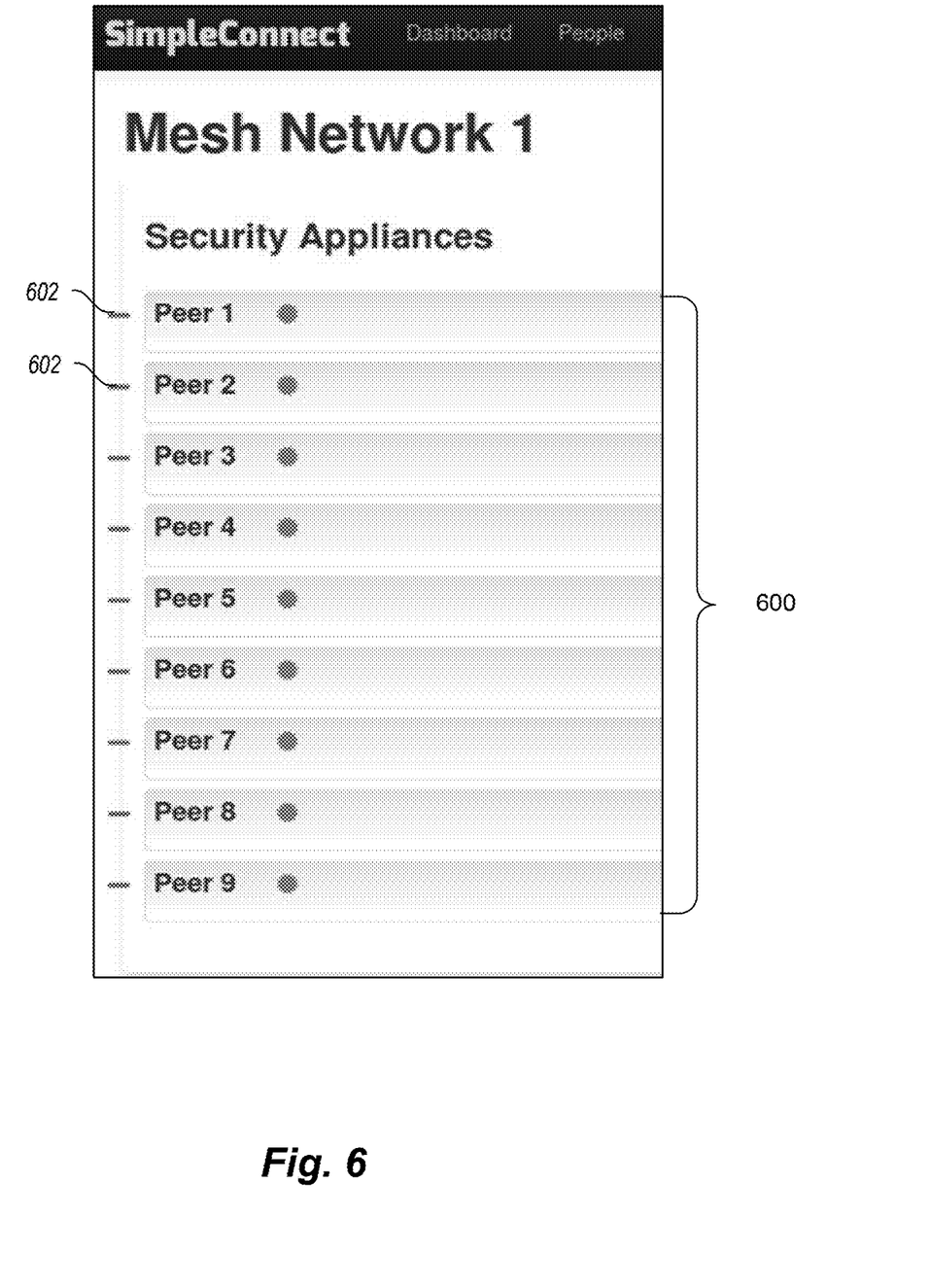
FIG. 6 is a screen print of a list of member devices in a mesh network, according to one illustrated embodiment.

At 504, a default blanket peer-to-peer mesh policy can be initially established, for example, as "deny-all" or "enable all". A "deny-all" mesh policy is indicated in FIG. 6, in which all peers in the list 600 are denied permission to join the network, and thus no communication is possible between any of the peers. The denied status 602 can be indicated by a visual indicator (e.g., dash 602) that can be displayed, for example, to the left of each peer in the member device list 600. An "enable all" mesh policy allows all peers in the member list 600 to communicate with one another. Such a blanket default policy ensures that each entrance to, or exit from, the network is intentional.

Figure 5:
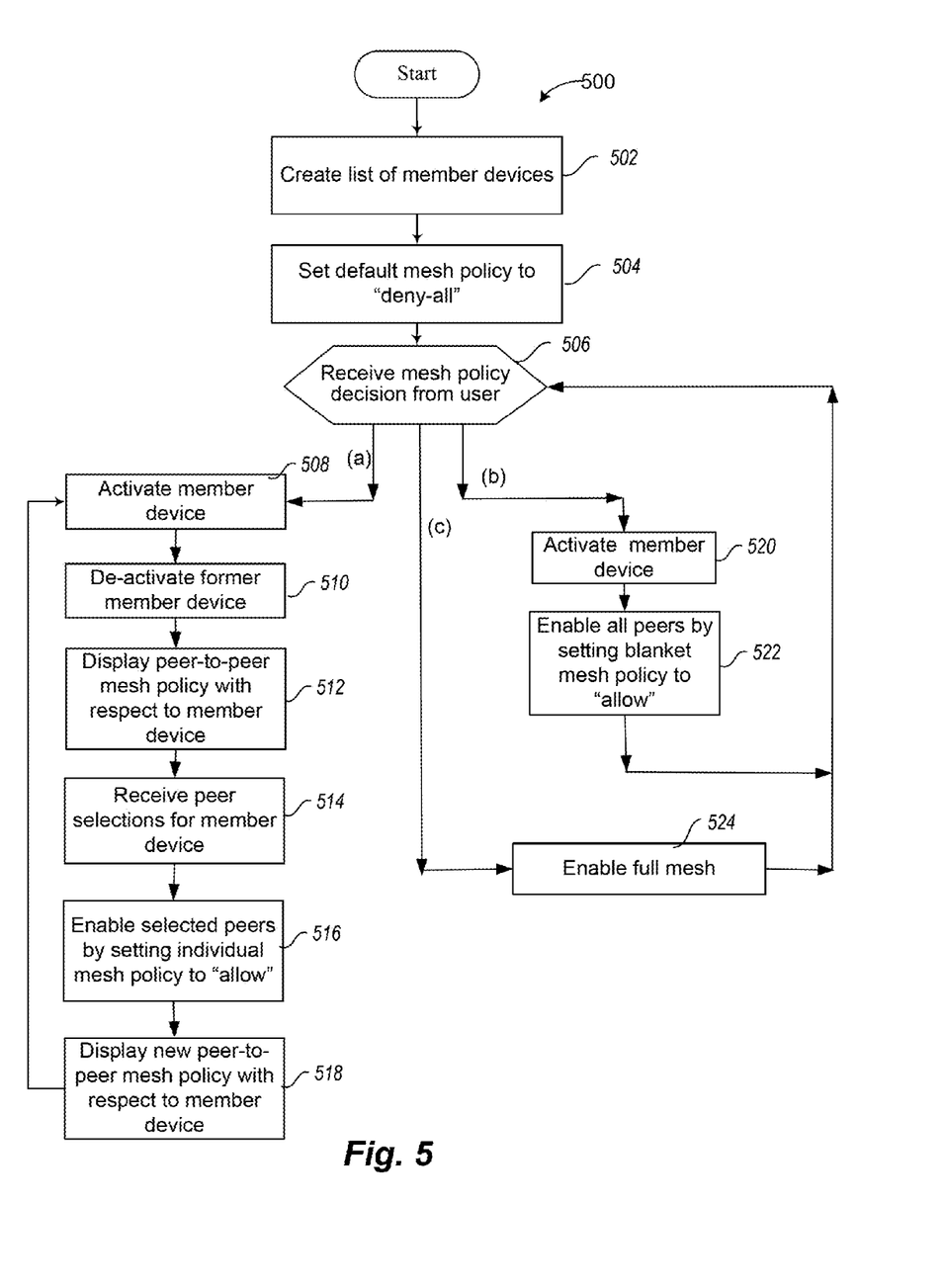
FIG. 5 is detailed flow diagram showing a method of operation of the industrial network security system, which implements a user-selectable peer-to-peer mesh policy, according to one illustrated embodiment.

At 506, a mesh policy decision is received from a user, for example, a decision to: a) enable selected peers on an individual basis; or b) enable a subset of the mesh that includes a selected member device and all of its peers; or c) enable the entire mesh by enabling all peer devices on the member device list 600. Although a particular ISA can be enabled and can join the network, that ISA does not necessarily have access to communicate with all the other ISAs on the network. Instead, a user can designate which of the ISA's peers are permitted to communicate with that ISA.

Figure 7:
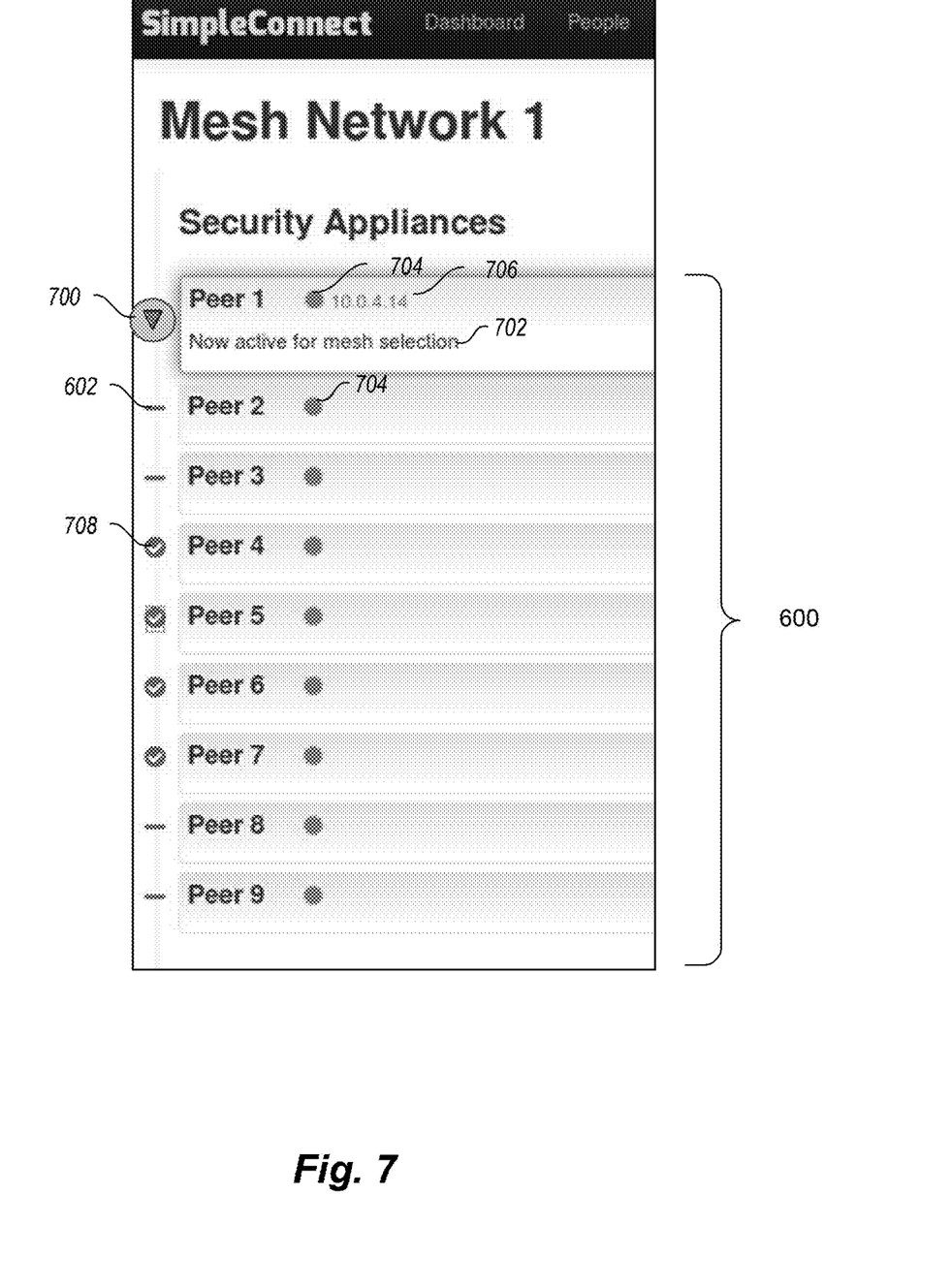
FIG. 7 is a screen print showing the status of a mesh network in which an individual peer-to-peer policy is used, according to one illustrated embodiment.

If decision (a) is received, at 506, the management platform 110 activates an individual member device at 508. FIG. 7 illustrates a user input indication of the decision (a), for example, activating ISA "Peer 1," as shown.

At 512, to indicate which peer is activated, the management platform 110 displays the peer-to-peer mesh policy status from the point of view of Peer 1. Instructions executing on the management platform 110 cause a pull-down menu 700 (FIG. 7) to appear to the left of the entry corresponding to Peer 1 in the list 600, and a message "Now active for mesh selection" 702 to appear below the entry corresponding to Peer 1. The presence of the pull-down menu icon 700 next to the entry corresponding to Peer 1 signifies that Peer 1 is currently activated.

At 514, peer selections can be received via the pull-down menu 700 (FIG. 7) such that a user can choose from among the peers (e.g, peers 2-9), "all", "none", or a subset of peers to join Peer 1's network. If "all" or "none" are desired, the user can indicate these choices by checking a single box on the pull-down menu (see FIG. 9). Otherwise, peer selections are received on an individual basis via the user interface 126 by the user toggling the dash 602 to a check mark 708.

At 516, if the selection received is "all", the management platform 110 sets each of the individual Peer 1-to-peer mesh policies to "allow" and notifies the relevant ISAs of the new policy configuration. If the selection received is "none," the management platform 110 sets each of the individual mesh policies to "deny" so that Peer 1 is not available to communicate with any peers and is therefore isolated. Otherwise, selected peers are enabled by setting individual mesh policies to "allow."

In the example shown in FIG. 7, Peer 1 is active and Peers 4, 5, 6, and 7 have been enabled for communication with Peer 1. In response, the management platform 110 updates the mesh policy configuration so that Peers 4, 5, 6, and 7 can each independently communicate with Peer 1. However, peers 4, 5, 6, and 7 are not necessarily enabled to communicate with one another.

At 518, the management platform 110 displays additional peer-to-peer policy status indicators, including an activation indicator 704 (e.g., a green dot) that appears, for example, to the right of Peer 1 and each one of its fellow peers in the list upon activation of Peer 1. The activation indicator 704 symbolizes each peer being in control of certain segments of the private overlay network 107. Once a dynamic IP address 706 has been assigned to Peer 1, the management platform 110 displays the dynamic IP address 706 in green next to the activation indicator 704. The dynamic IP address 706 may be displayed with a visual indicator of the activated states. For instance, the dynamic IP address 706 may be displayed in the color green or with other visual emphasis. As additional peers are selected (e.g., peers 4, 5, 6, and 7), the management platform 110 displays the dynamic IP addresses of the peers next to their respective activation indicator 704.

The method 500 repeats when the management platform 110 receives input from a user to activate a different peer. At 508, in response to such user input, the management platform 110 activates Peer 5.

At 510, as Peer 5 is activated, Peer 1 is de-activated. Activation can be considered as a token that is passed around among the peers. Thus, only one peer at a time can be "activated." Upon being de-activated, Peer 1 is still enabled to communicate with peers 4, 5, 6, and 7. However, Peer 1 cannot add any more peers to its network without being activated again.

Figure 8:
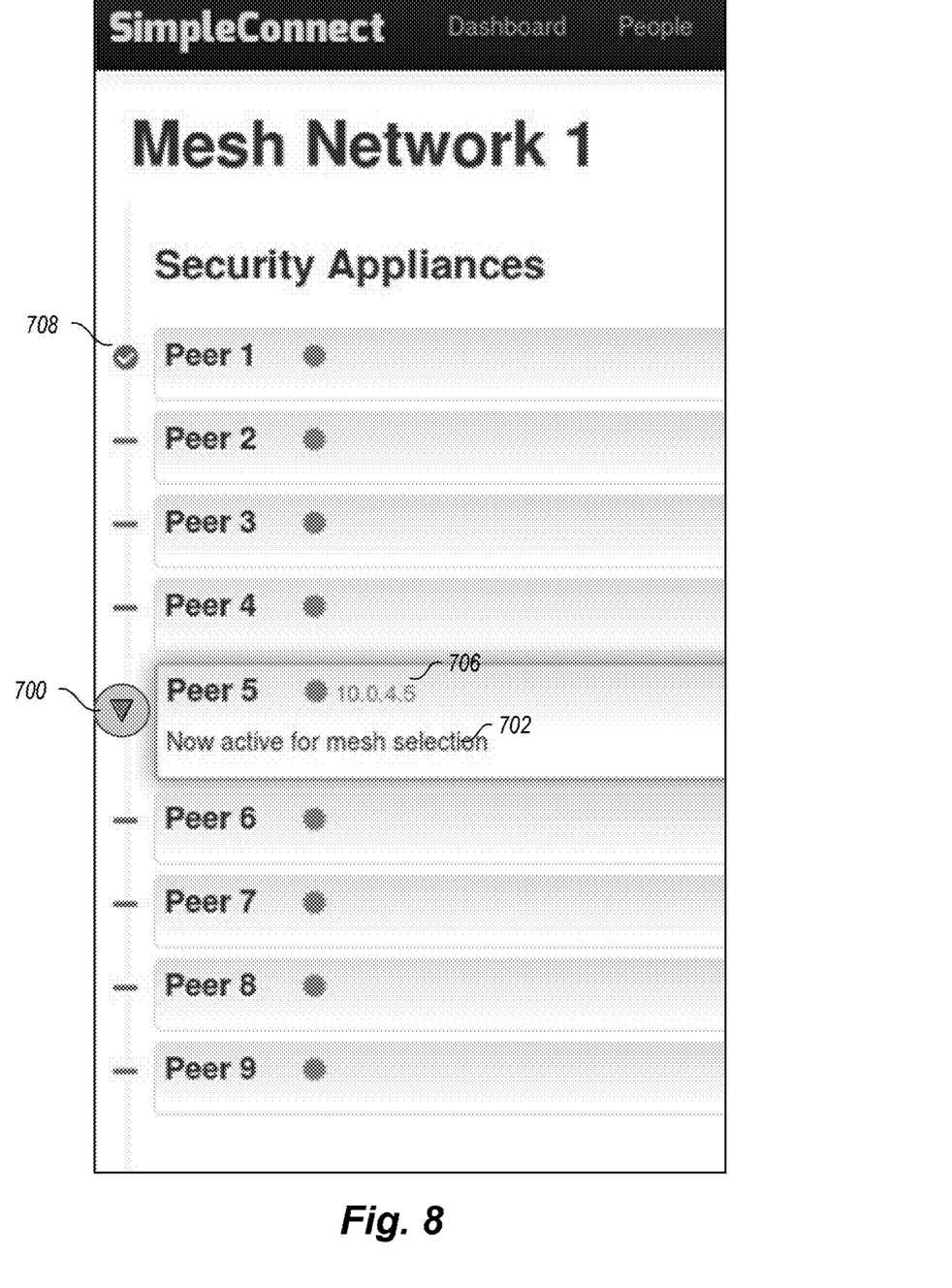
FIG. 8 is a screen print showing the status of a mesh network in which a symmetric individual peer-to-peer policy is used, according to one illustrated embodiment.
Figure 9:
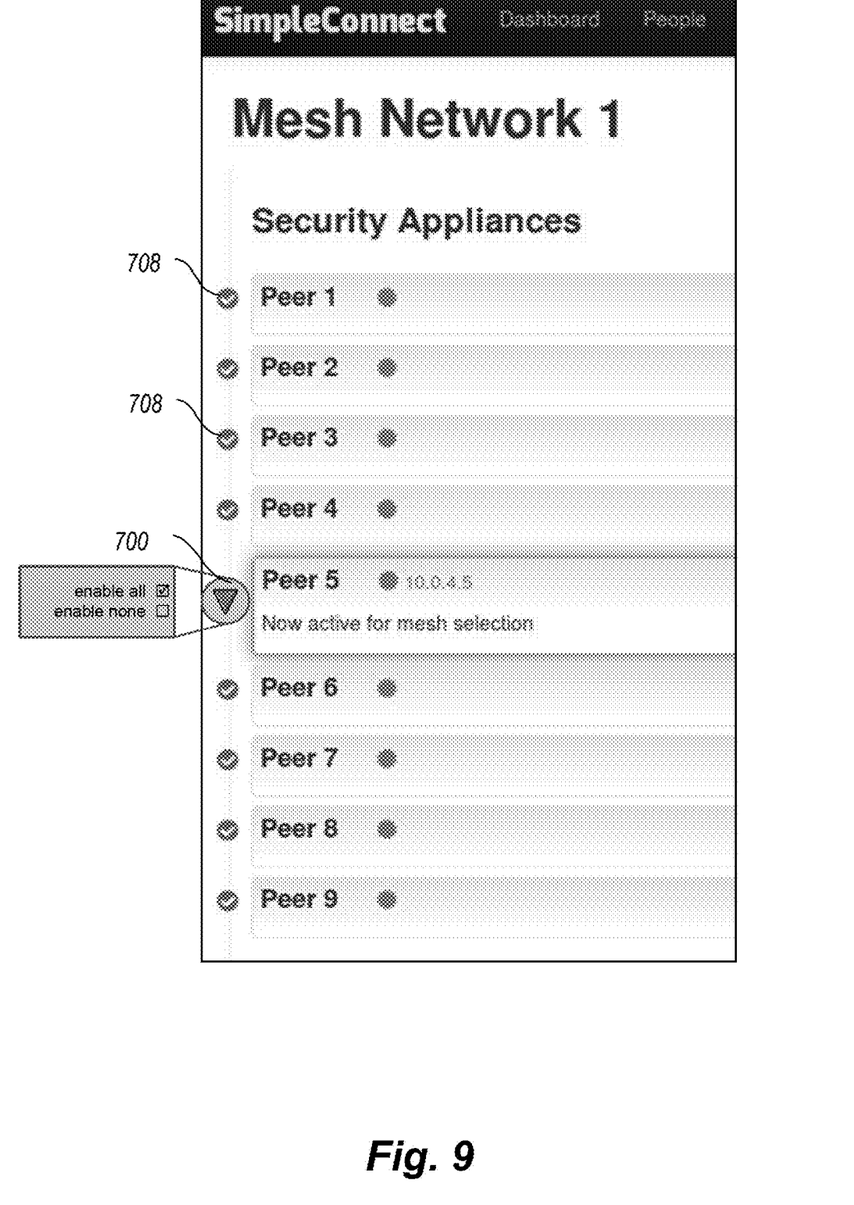
FIG. 9 is a screen print showing the status of a mesh network in which a peer-to-peer policy that enables a full mesh is used, according to one illustrated embodiment.
Figure 10:
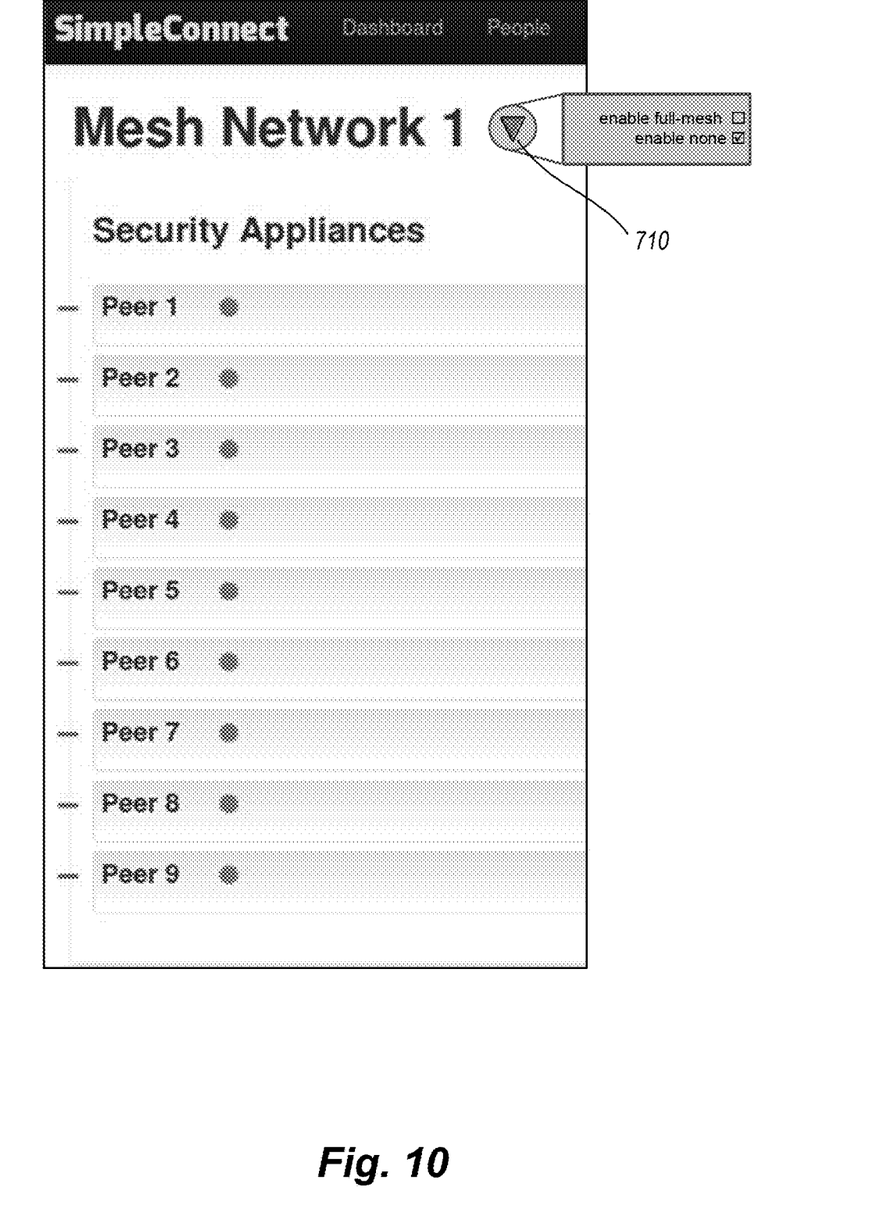
FIG. 10 is a screen print showing the status of a mesh network in which a peer-to-peer default mesh policy is used to prevent network access by all peers, according to one illustrated embodiment.

At 512, the management platform displays the peer-to-peer policy status with respect to Peer 5 instead of Peer 1, as shown in FIG. 8, indicated by the presence of the pull-down menu 700 (FIG. 7) next to the entry for Peer 5 in the member list 600. By activating Peer 5, the user can see that Peer 1 is part of Peer 5's network, but Peers 4, 6, and 7 are not enabled to communicate with Peer 5. However, because a connection was already established with Peer 5 when Peer 1 was activated, that connection is sustained from the point of view of Peer 5. Accordingly, the management platform 110 (FIG. 1) continues to enable Peer 1 to communicate with Peer 5 by maintaining Peer 1's individual mesh policy with respect to Peer 5 as "allow." This act maintains symmetry of the peer-to-peer mesh policy by granting reciprocity to pairs of peers.

At 518, the management platform 110 displays the sustained peer-to-peer mesh policy by showing a check mark 708 (FIG. 7) to the left of Peer 1. Using the pull-down menu 700 (FIG. 7), additional peers can be enabled to join Peer 5's network.

If decision (b) is received (FIG. 9), at 520, the management platform 110 activates a member device (e.g., Peer 5).

At 522, user input can be received via the pull-down menu 700, to enable all peers in the member list 600 (FIG. 7) using a single command. In response to the user checking the box "enable all"; the management platform sets a blanket mesh policy to "allow." The management platform 110 displays all of the peer-to-peer status indicators as check marks 708, and all of the peers are enabled to join Peer 5's network.

If decision (c) is received via the pull-down menu 710 (FIG. 10), the management platform 110 updates the mesh policy configuration at 524 to "enable full mesh", so that all of the peers can join the network and communication can occur between any peer and any other peer.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via application-specific integrated circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of non-transitory signal bearing media used to actually carry out the distribution. Examples of signal bearing media include, but are not limited to, the following: recordable type media such as floppy disks, hard disk drives, CD ROMs, digital tape, and computer medium.

The various embodiments described above can be combined to provide further embodiments. All of the commonly assigned US patent application publications, US patent applications, foreign patents, foreign patent applications and non-patent publications referred to in this specification and/or listed in the Application Data Sheet, including but not limited to U.S. Provisional Patent Application No. 61/794,511, filed Mar. 15, 2013 are incorporated herein by reference, in their entirety.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A network security system that provides secure communication paths for one or more operations devices linked to a business network, the system comprising:
   a management platform selectively communicatively coupled to the business network;
   one or more processor-based security appliances selectively coupled between the one or more operations devices and the business network;
   a virtual private overlay network, selectively communicatively coupling the one or more operations devices to one another and to the one or more processor-based security appliances, wherein each dynamic host configuration protocol (DHCP) request by the one or more operations devices to a DHCP server are replied to by the one or more processor-based security appliances that provide a corresponding DHCP response instead of the DHCP server;
   a policy that configures the virtual private overlay network as a mesh network, wherein segments of the virtual private overlay network are dynamically disabled or enabled by the management platform in response to one or more selections in the policy made by a user; and
   a non-transitory processor-readable storage medium containing instructions that cause the one or more processor-based security appliances to configure itself so as to monitor and control data traffic and connectivity relationships between the one or more operations devices and the business network.

2. The security system of claim 1 wherein each of the one or more processor-based security appliances is equipped with a bi-directional wireless communication device.

3. The security system of claim 2 wherein an industrial automation network is a manufacturing automation network and the business network is a corporate network.

4. The security system of claim 1 wherein the instructions further cause the one or more processor-based security appliances to filter the data traffic between the one or more operations devices and the business network.

5. The security system of claim 4 wherein filtering the data traffic includes controlling access to the one or more operations devices.

6. The security system of claim 1 wherein the one or more operations devices are communicatively coupled to an industrial network.

7. The security system of claim 1 wherein the one or more processor-based security appliances provides dynamic network addressing.

8. The security system of claim 1 wherein the one or more processor-based security appliances function as a wireless network node for authorized industrial devices.

9. The security system of claim 1 wherein the one or more processor-based security appliances is a virtual security appliance.

10. The security system of claim 1 wherein each of the one or more processor-based security appliances is further coupled to a redundant, standby, virtual security appliance to create a high availability pair.

11. The security system of claim 1 wherein the security appliances are communicatively coupled in a mesh configuration to form a private overlay network.

12. The security system of claim 11 wherein the management platform sets peer-to-peer mesh policies to enable communication among the one or more processor-based security appliances via the private overlay network, in response to user inputs.

* * * * *